U S007441735B2

(12) United States Patent
Zhao et al.

(10) Patent No.: US 7,441,735 B2
(45) Date of Patent: Oct. 28, 2008

(54) SUPPORTING APPARATUS FOR LCD MODULE

(75) Inventors: Jiang Zhao, Shenzhen (CN); Hung-Chun Lu, Tu-Cheng (TW); Chien-Li Tsai, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 5 days.

(21) Appl. No.: 11/309,406

(22) Filed: Aug. 4, 2006

(65) Prior Publication Data
US 2007/0090248 A1   Apr. 26, 2007

(30) Foreign Application Priority Data
Sep. 22, 2005   (CN)   ................. 2005 2 0064986

(51) Int. Cl.
*E06B 7/28* (2006.01)
(52) U.S. Cl. .................. 248/220.22; 248/289.11; 248/922
(58) Field of Classification Search ............ 248/289.11, 248/919, 922, 220.22; 349/58; 345/31; 361/681; 16/340
See application file for complete search history.

(56) References Cited

U.S. PATENT DOCUMENTS

| 1,549,291 | A | * | 8/1925 | Broman | 248/289.11 |
| 2,738,942 | A | * | 3/1956 | Gantner | 248/289.11 |
| 5,335,142 | A | * | 8/1994 | Anderson | 361/681 |
| 5,997,493 | A | * | 12/1999 | Young | 602/16 |
| 6,164,611 | A | * | 12/2000 | Kuhnke | 248/279.1 |
| 6,378,830 | B1 | * | 4/2002 | Lu | 248/278.1 |
| 6,601,810 | B2 | * | 8/2003 | Lee | 248/278.1 |
| 7,055,218 | B2 | * | 6/2006 | Lu et al. | 16/367 |
| 2003/0075653 | A1 | * | 4/2003 | Li | 248/274.1 |
| 2004/0084578 | A1 | * | 5/2004 | Cho et al. | 248/125.1 |

* cited by examiner

*Primary Examiner*—Korie H. Chan
(74) *Attorney, Agent, or Firm*—Wei Te Chung

(57) ABSTRACT

A supporting apparatus for supporting an LCD module, the supporting apparatus comprises a pivoting member, a fastener assembly connecting the pivoting member to the LCD module, a supporter and a connecting member. The supporter comprises a base wall and two sidewalls extending from the base wall. The connecting member connects the pivoting member to the supporter, and comprises a top wall and two arms extending from two opposite edges of the top wall. The arms are mounted to the sidewalls of the supporter separately.

9 Claims, 7 Drawing Sheets

SUPPORTING APPARATUS FOR LCD MODULE

FIELD OF THE INVENTION

The present invention relates to supporting apparatuses, and more particularly to a supporting apparatus which can be turned about both a horizontal axis and a vertical axis.

DESCRIPTION OF RELATED ART

LCD modules as computer peripheral equipment are welcome because of being light-weight and having excellent display quality. A conventional supporting apparatus for the LCD modules can be adjusted about a horizontal axis and a vertical axis so the LCD modules can be turned up or down and turned left or right.

Sturdiness of the supporting apparatus is very important, especially during adjustment of the viewing angle. As shown in FIG. 1 and FIG. 2, a conventional supporting apparatus includes a pivoting member 20a defining a through hole 222a therein, two fasteners 30a fixing the pivoting member 20a to an LCD module 10a, a U-shaped support member 40a, and an L-shaped connecting member 50a connecting the pivoting member 20a to the support member 40a pivotably. The support member 40a includes a base wall 42a and two opposite sidewalls 44a extending from the base wall 42a. The connecting member 50a includes a first sidewall 52a connected to a second sidewall 54a, and a through hole 522a defined in the first sidewall 52a. An end of the support member 40a is covered by the first sidewall 52a of the connecting member 50a. A bolt 60a extends through the through hole 222a and the through hole 522a to fix the connecting member 50a to the pivoting member 20a pivotably. The second sidewall 54a of the connecting member 50a is mounted to the base wall 42a of the support member 40a.

The disadvantage of the supporting apparatus is that the connecting member 50a may be easily warped or damaged. According to force analysis for the connecting member 50a, as shown in FIG. 3, an upward component of force F1 caused by offset mounting of the LCD module 10a is inflicted on the middle portion of the first sidewall 52a of the connecting member 50a. The force F1 on the connecting member is represented as a moment $M=F1*L$ relative to a corner between the first sidewall 52a and the second sidewall 54a, in which the L is a distance from the middle portion of the first sidewall 52a of the connecting member 50a to the corner between the first sidewall 52a and the second sidewall 54a. The moment M may splay the angle between the first sidewall 52a and the second sidewall 54a of the connecting member 50a, thus warping the connecting member 50a.

What is desired, therefore, is a supporting apparatus which securely supports an LCD module.

SUMMARY OF THE INVENTION

In one preferred embodiment, a supporting apparatus for supporting an LCD module, comprises a pivoting member, a fastener assembly connecting the pivoting member to the LCD module, a supporter and a connecting member. The supporter comprises a base wall and two sidewalls extending from the base wall. The connecting member connects the pivoting member to the supporter, and comprises a top wall and two arms extending from two opposite edges of the top wall. The arms are mounted to the sidewalls of the supporter separately.

Other advantages and novel features will become more apparent from the following detailed description of preferred embodiments when taken in conjunction with the accompanying drawings, in which:

DETAILED DESCRIPTION OF THE INVENTION

Figure 4:
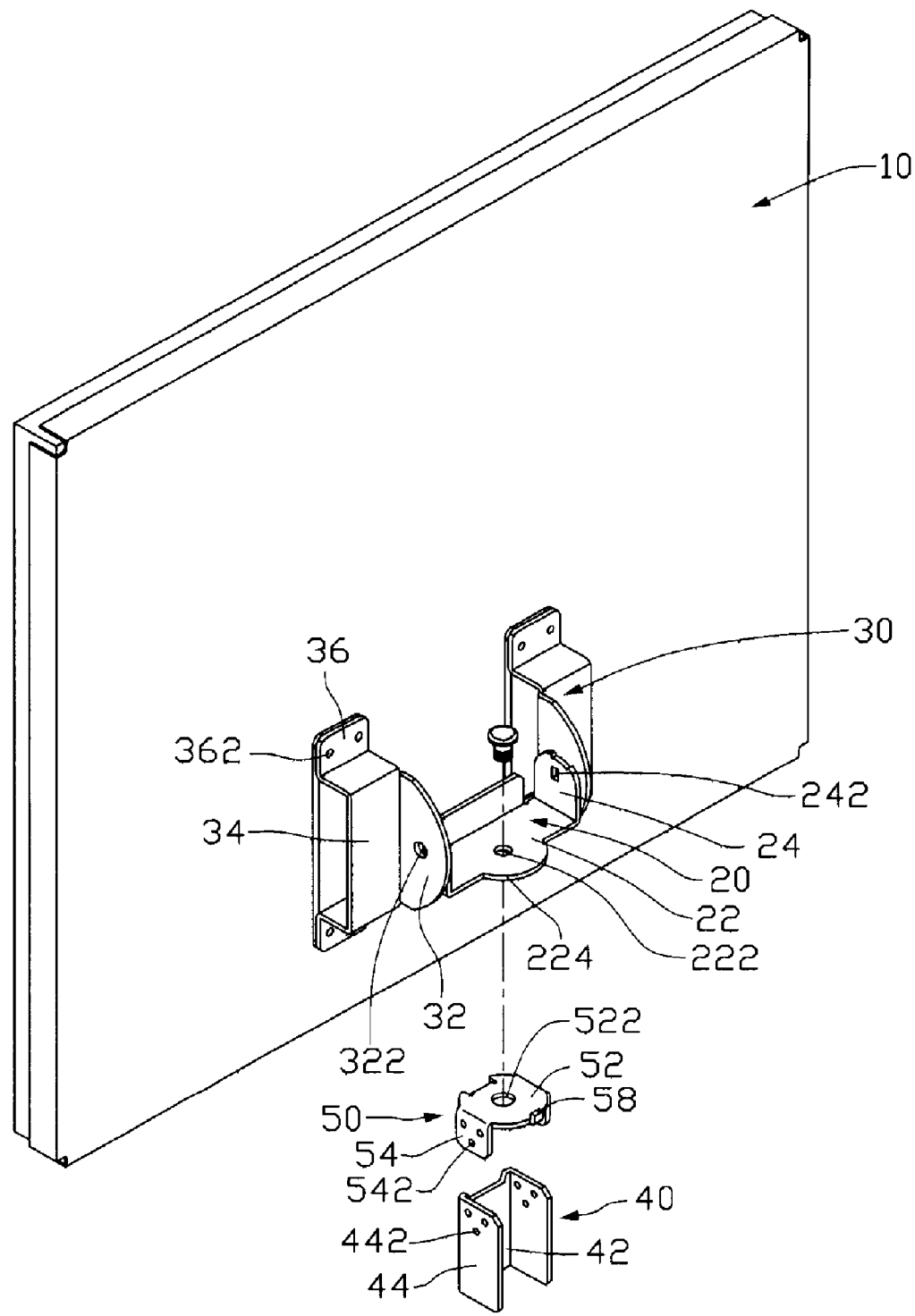
FIG. 4 is an exploded, isometric view of a supporting apparatus in accordance with a preferred embodiment of the present invention, with an LCD module.
Figure 5:
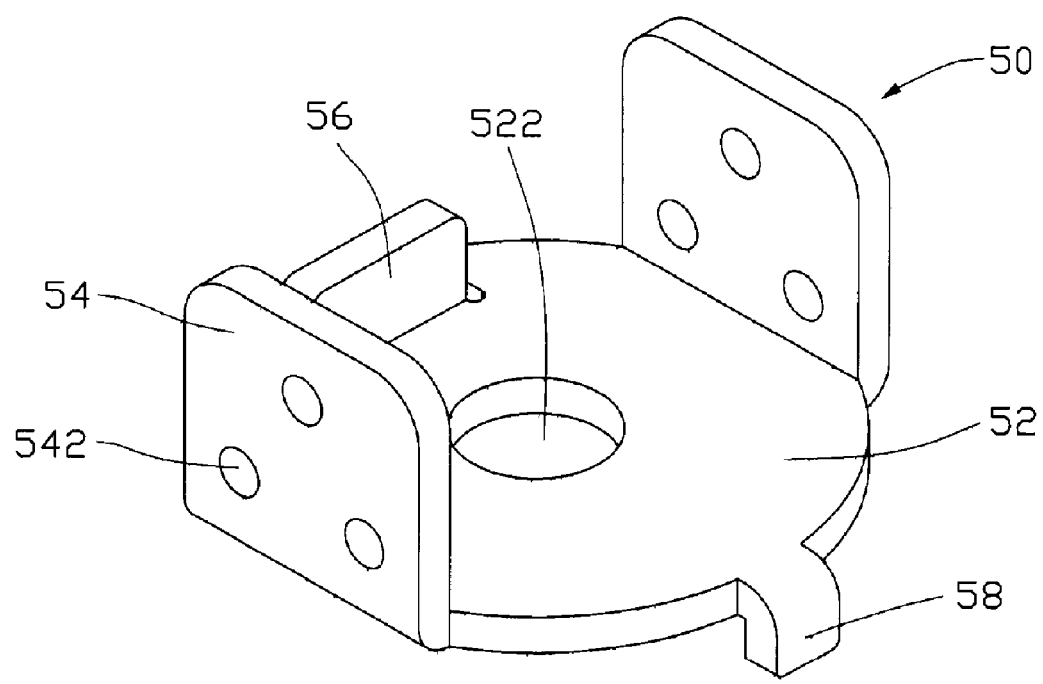
FIG. 5 is an enlarged inverted view of a connecting member of the supporting apparatus of FIG. 4.

Referring to FIGS. 4 and 5, in a preferred embodiment of the present invention, a supporting apparatus of a display device is provided for supporting a display module of the display device. The supporting apparatus includes a pivoting member 20, a fastener assembly connecting the display device to the pivoting member 20, a supporter 40, and a connecting member 50 connecting the supporter 40 to the pivoting member 20. The display module is an LCD module 10 in the preferred embodiment, and the fastener assembly includes two fasteners 30.

The pivoting member 20 includes a main plate 22, and a pivoting hole 222 is defined in a middle portion of the main plate 22. A semicircular plate 224 is protruded from the main plate 22, having a common center with the pivoting hole 222. Two ears 24 extend up from two opposite sides of the main plate 22, and each define a quadrate hole 242 therein.

Each fastener 30 includes a mounting portion 34, a mounting plate 32 extending perpendicularly from the edge of the mounting portion 34, and two mounting pieces 36 extending perpendicularly from opposite ends of the mounting portion 34. A through hole 322 is defined in each mounting plate 32. Two mounting holes 362 are defined in each mounting piece 36.

The supporter 40 is U-shaped, and includes a base wall 42, and two sidewalls 44 extending perpendicularly from two opposite edges of the base wall 42. Three mounting holes 442 are defined in each sidewall 42.

The connecting member 50 includes a top wall 52, and two arms 54 extending down from two opposite edges of the top wall 52. A through hole 522 is defined in the top wall 52. Three mounting holes 542 are defined in each arm 54. A downward block 56 and an upward locating portion 58 extend from another two opposite edges of the top wall 52 respectively.

Figure 6:
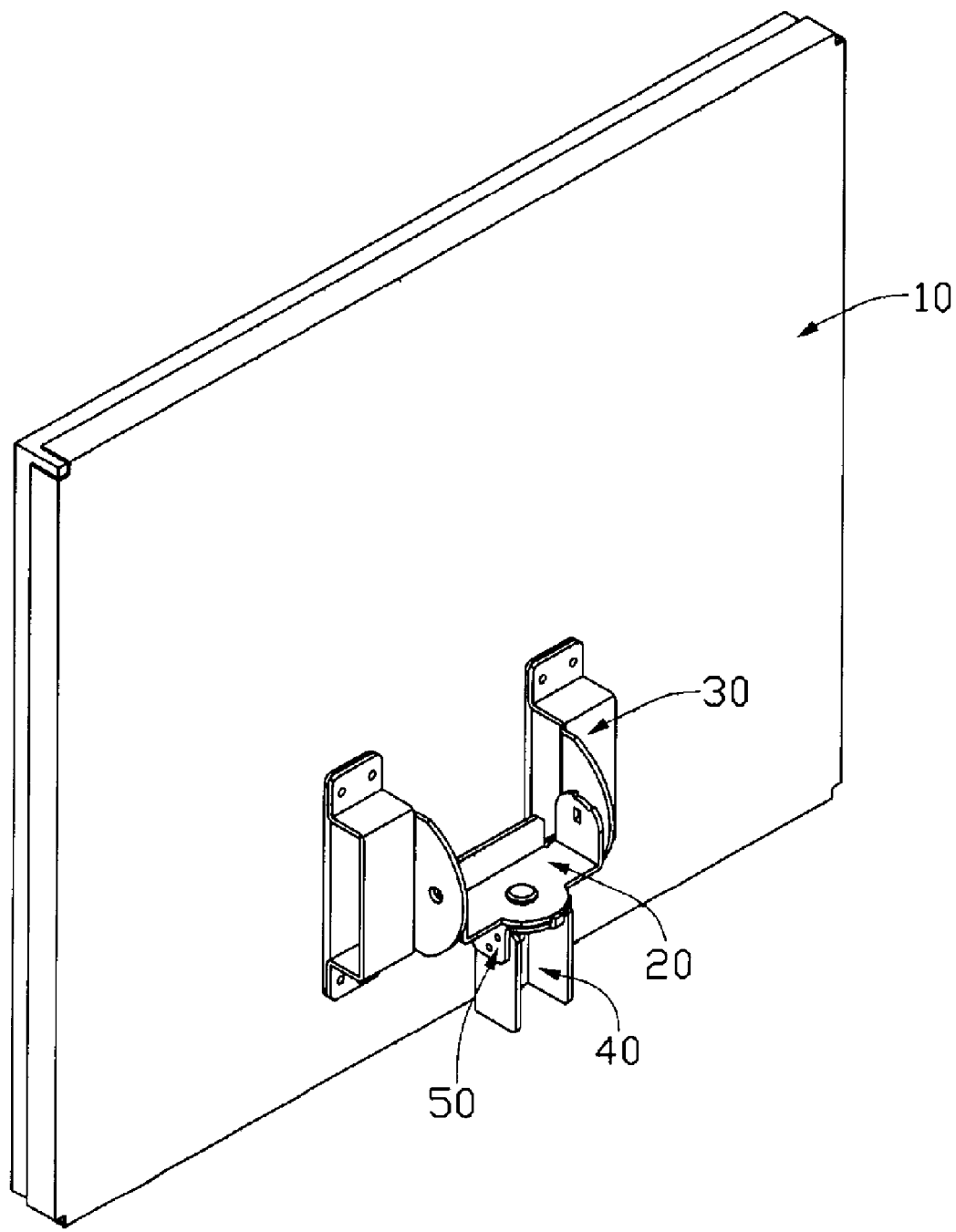
FIG. 6 is an isometric, assembled view of FIG. 4.

Referring also to FIG. 6, in assembly, the pivoting member 20 is pivotably connected to the connecting member 50 by a screw (not labeled) extending through the pivoting hole 222 of the pivoting member 20 and into the through hole 522 of the connecting member 50, so that the pivoting member 20 is pivoted around an axis relative to the connecting member 50. Then the locating member 58 of the connecting member 50 engages an arced shaped edge of the semicircular plate 224 of the pivoting member 20, and the pivoting member 20 is pivotable relative to the connecting member 50. The connecting member 50 is mounted to the supporter 40 by a plurality of rivets (not shown) extending through the mounting hole 542 of the connecting member 50 and into the mounting hole 442 of the supporter 40. Then the block 56 of the connecting member 50 engages an outer edge of the base wall 42. The pivoting member 20 is pivotably attached to the fasteners 30 between the mounting plates 32 by two screws (not shown) extending through the through holes 322 into the quadrate hole 242, so that the pivoting member 20 is pivoted around another axis relative to the connecting member 50. The fasteners 30 are mounted to the LCD module 10 via the mounting pieces 36 of the fasteners 30.

Figure 1:
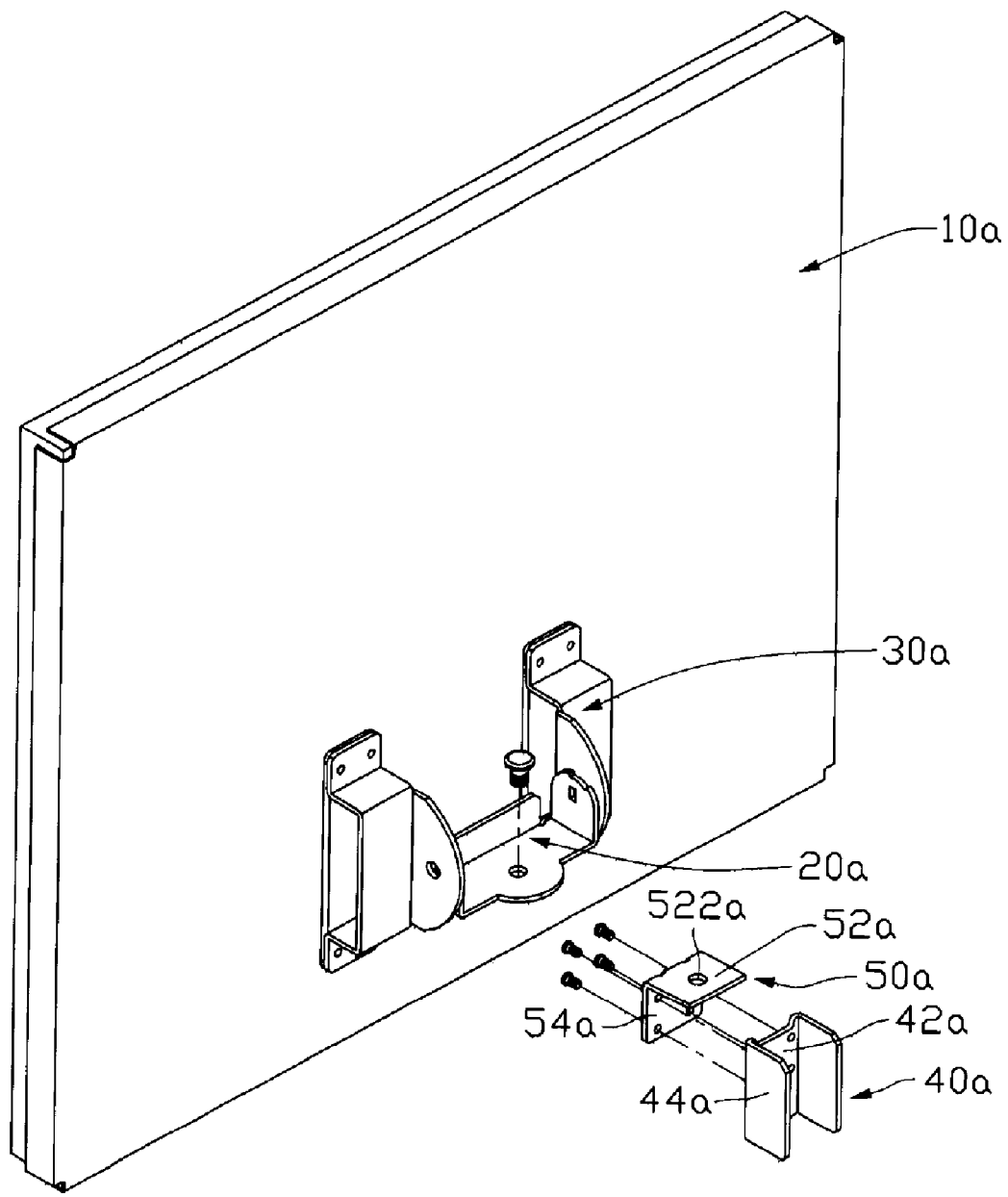
FIG. 1 is an isometric, exploded view of a conventional supporting apparatus, with an LCD module.
Figure 2:
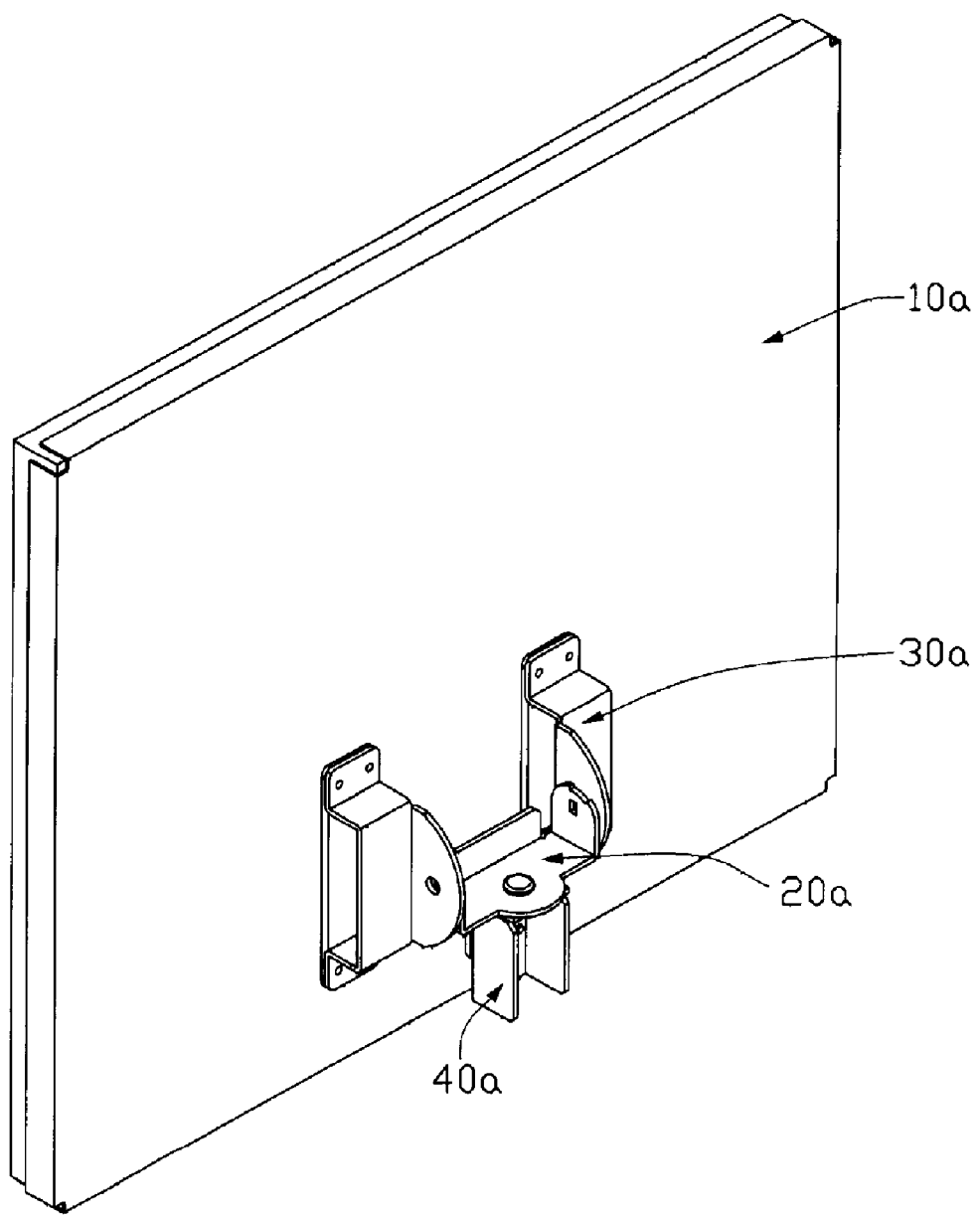
FIG. 2 is an isometric, assembled view of FIG. 1.
Figure 3:
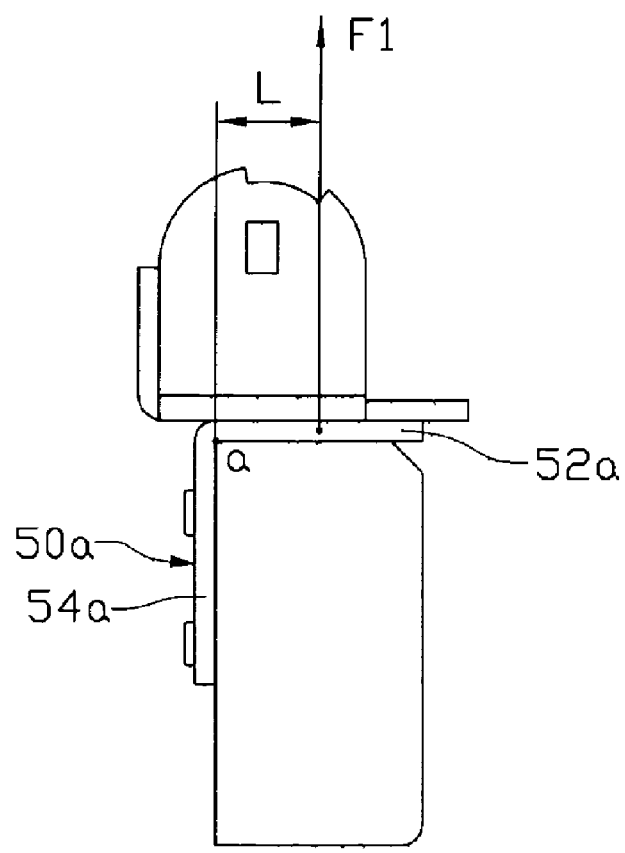
FIG. 3 is a force analysis view of a connecting member of the conventional supporting apparatus of FIG. 1.
Figure 7:
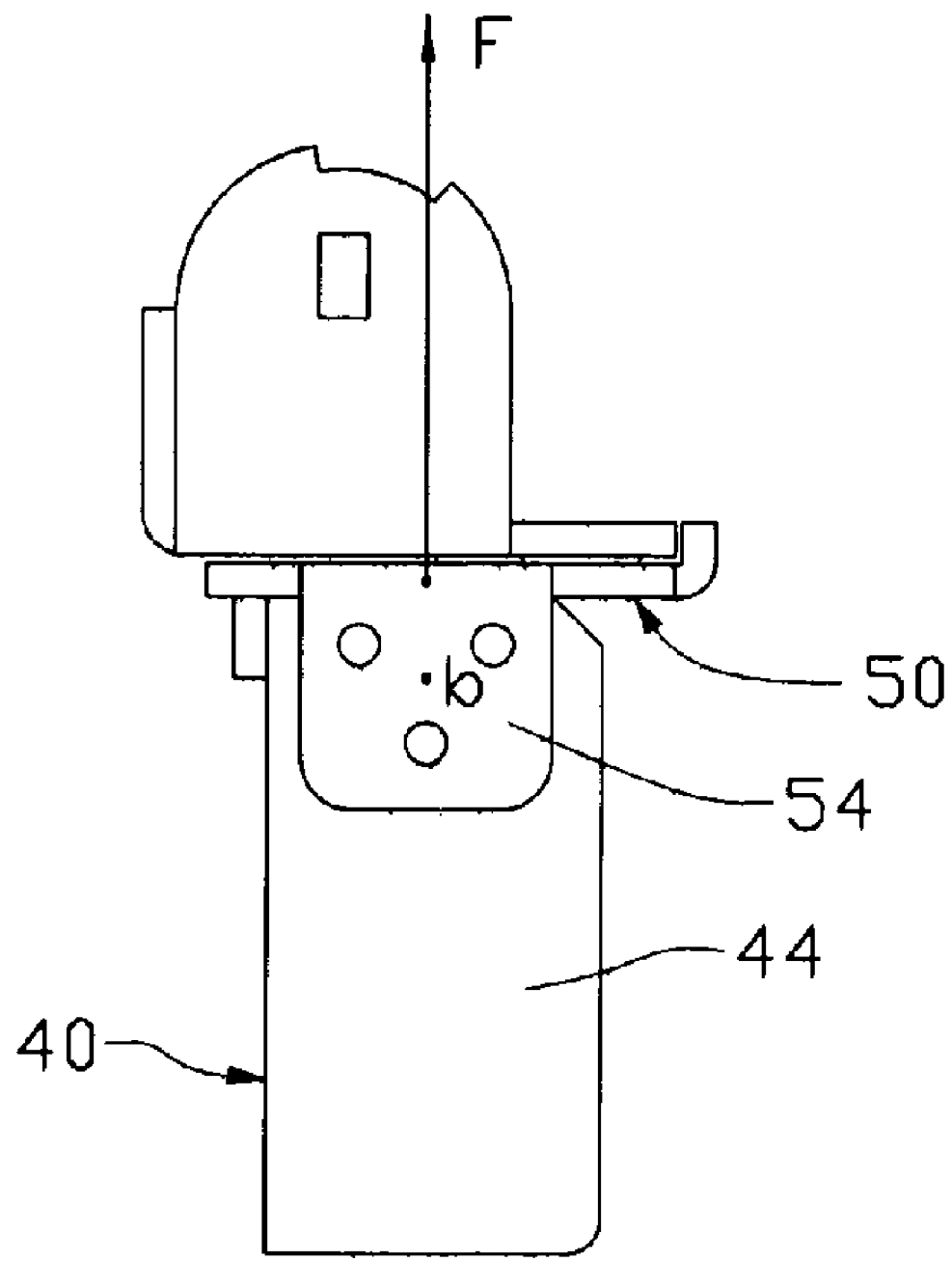
FIG. 7 is a force analysis view of the connecting member of the supporting apparatus of FIG. 4.

Referring also to FIG. 7, by this mounting way, a focal point of a force F on the connecting member 50 is changed from that of point a (as shown in FIG. 3) to a point b (as shown in FIG. 7). With force F more centered among the mounting holes 442 of the connecting member 50, the LCD module 10 is stably mounted to a base seat.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A supporting apparatus for supporting an LCD module, the supporting apparatus comprising:
    a pivoting member;
    a fastener assembly connecting the pivoting member to the LCD module;
    a supporter comprising a base wall and two sidewalls extending from the base wall; and
    a connecting member connecting the pivoting member to the supporter, the connecting member comprising a top wall and two arms extending down from two opposite edges of the top wall, the arms being mounted to the two sidewalls of the supporter respectively;
    wherein the pivoting member comprises a main plate with a pivoting hole defined therein, and the connecting member defines a through hole, a screw extends from the pivoting hole into the through hole;
    wherein a locating portion extends from an edge of the top wall of the connecting member, and a semicircular plate is protruded from the main plate, and the locating portion engages an edge of the semicircular plate.

2. The supporting apparatus as claimed in claim 1, wherein the supporter is U-shaped, and the sidewalls are perpendicular to the base wall of the supporter.

3. The supporting apparatus as claimed in claim 1, wherein a block extends down from an edge of the connecting member and engages an outer edge of the base wall of the supporter.

4. The supporting apparatus as claimed in claim 1, wherein two ears each with a quadrate hole defined therein extend from two opposite edges of the main plate of the pivoting member respectively, and the fastener assembly comprises two fasteners, and the pivoting member is pivotably connected to the fastener assembly between the fasteners via the quadrate holes.

5. The supporting apparatus as claimed in claim 1, wherein a plurality of mounting holes are defined in each of the sidewalls of the supporter, and a plurality of mounting holes are defined in each of the arms of the connecting member, and the connecting member is mounted to the supporter via the mounting holes of the connecting member and the mounting holes of the supporter.

6. A supporting apparatus for supporting a display module, the supporting apparatus comprising:
    a pivoting member, a semicircular plate protruding from a main plate of the pivoting member;
    two fasteners mounted to a back of the LCD module, and so that the pivoting member being pivoted around an axis relative to the fasteners;
    a supporter; and
    a connecting member connecting the pivoting member to the supporter, a locating portion extending from an edge of the top wall of the connecting member for engaging with an edge of the semicircular plate of the pivoting member, thus the pivoting member being pivoted around another axis relative to the connecting member, the connecting member being mounted to the supporter via two detached connecting area between the connecting member and the supporter.

7. The supporting apparatus as claimed in claim 6, wherein the supporter comprises a base wall and two sidewalls extending from the base wall.

8. The supporting apparatus as claimed in claim 7, wherein the connecting member comprises a top wall and two arms extending from two opposite edges of the top wall, and the arms are mounted to the two sidewalls of the supporter respectively.

9. A supporting apparatus for supporting an LCD module, the supporting apparatus comprising:
    a pivoting member;
    a fastener assembly connecting the pivoting member to the LCD module;
    a supporter comprising a base wall and two sidewalls extending from the base wall; and
    a connecting member connecting the pivoting member to the supporter, the connecting member comprising a top wall and two arms extending from two opposite edges of the top wall, the arms being mounted to the two sidewalls of the supporter respectively;
    wherein the pivoting member comprises a main plate with a pivoting hole defined therein, and the connecting member defines a through hole, a screw extends from the pivoting hole into the through hole;
    wherein two ears each with a quadrate hole defined therein extend from two opposite edges of the main plate of the pivoting member respectively, and the fastener assembly comprises two fasteners, and the pivoting member is pivotably connected to the fastener assembly between the fasteners via the quadrate holes.

* * * * *